(12) United States Patent
Ueda et al.

(10) Patent No.: US 6,254,814 B1
(45) Date of Patent: Jul. 3, 2001

(54) MOLDING COMPOUND FOR ARTICLES INCLUDING A CELLULOSE FIBER AND A METHOD FOR MOLDING THE SAME

(75) Inventors: Seiichi Ueda; Seio Higaki; Manabu Sudo; Kousuke Yagi; Masahiko Funaki, all of Moriguchi (JP)

(73) Assignee: Daiho Industrial Co., Ltd., Osaka (JP)

( * ) Notice: Subject to any disclaimer, the term of this patent is extended or adjusted under 35 U.S.C. 154(b) by 0 days.

(21) Appl. No.: 09/248,292

(22) Filed: Feb. 11, 1999

(30) Foreign Application Priority Data

| Feb. 12, 1998 | (JP) | 10-046242 |
| Mar. 27, 1998 | (JP) | 10-100109 |
| May 14, 1998 | (JP) | 10-150549 |
| Oct. 21, 1998 | (JP) | 10-318353 |

(51) Int. Cl.[7] .................... B27N 5/02
(52) U.S. Cl. ............ 264/119; 264/109; 264/328.2
(58) Field of Search ............ 264/328.1, 328.2, 264/328.7, 328.16, 328.17, 328.18, 330, 331.11

(56) References Cited

U.S. PATENT DOCUMENTS

| 4,508,595 | * | 4/1985 | Gàsland | 264/328.18 |
| 4,673,438 | * | 6/1987 | Wittwer et al. | 264/328.18 |

FOREIGN PATENT DOCUMENTS

| 823839 | 4/1975 | (BE) . |
| 07124914 | 5/1995 | (JP) . |
| 07186114 | 7/1995 | (JP) . |
| 07223210 | 8/1995 | (JP) . |
| 08131987 | 8/1996 | (JP) . |
| 09076213 | 3/1997 | (JP) . |
| WO 94/18384 | 8/1994 | (WO) . |
| WO 96/05254 | 2/1996 | (WO) . |

* cited by examiner

Primary Examiner—Mary Lynn Theisen
(74) Attorney, Agent, or Firm—McDermott, Will & Emery

(57) ABSTRACT

There is disclosed a molding compound for making an article including a cellulose fiber, which is prepared by mixing a cellulose fiber added with at least starch, water and a long chain fatty acid salt of a non-alkali metal. There is also described a method for molding an article including a cellulose fiber by employing the above compound and, further, a mold for molding an article including a cellulose fiber with a cavity formed by a stationary side and a movable side which is used therefore.

10 Claims, 5 Drawing Sheets

MOLDING COMPOUND FOR ARTICLES INCLUDING A CELLULOSE FIBER AND A METHOD FOR MOLDING THE SAME

BACKGROUND OF THE INVENTION

The present invention relates to a technique for molding and obtaining a biodegradable article such as seed-rasing container, an non-electrostatic article such as packaging container for delivering a compact disc, a tray for an IC and the like, which comprises papers such as waste papers, wood-pulp papers and the like.

(1) Molding Compound

Hitherto, when an article including a waste paper was molded by using a conventional molding composition, there was a problem during the kneading step that the molding compound is easy to stick onto a wall of a kneader, a die and the like, resulting in poor workability.

Also in a step of drying and solidifying the molding compound charged in a cavity of a mold, the surface of the composition in contact with the wall of the cavity is dried and solidified first to form a surface layer. Further, since the surface layer is very thin immediately after completion of the charging, there is a possibility that the surface layer adheres to the wall of the cavity when a vapor pressure or a charging pressure is applied to the surface layer. In such a case, water added into the molding compound is vaporized by the mold which is heated to a high temperature. And it is difficult to discharge the water vapor by a degassing means through the interface between the wall of the cavity and the surface layer.

Further, if the surface layer adheres onto the wall of the cavity, there is a problem of crack development in the molded article due to frictional resistance with the wall of the cavity when a solidified molded article is released.

Namely, it is eagerly desired that a molding compound is not liable to stick onto a wall of a kneader during the kneading step and is facilitating water discharge during the molding step. Further, it is required that the molding compound provides a molded article which is easily released from the mold and does not generate a crack.

(2) Molding Method

In the conventional method of molding an article including a cellulose fiber, a molding compound obtained by adding and kneading a pulverized waste paper, starch and water is charged into a cavity of a heated mold and, then, dried and solidified by discharging a water vapor from the molding composition.

As means for discharging the water vapor, there is suggested a flash-type mold which is provided with degassing means with micro pores in the wall of the cavity (for example, refer to JP-A-9-76213). When the molding is conducted with such a flash-type mold, it is suggested that the charging pressure is increased to obtain a molded article having superior transferring property, dimensional accuracy, low air permeability and high density (for example, refer to JP-A-9-109113). In such case, a positive mold is employed to prevent the molding compound from flowing out from the cavity even if the mold is opened slightly. And, after charging the molding compound while opening the positive mold slightly, a part of the water vapor is discharged by means of degassing means. Then, the remaining water vapor is discharged after the mold is closed.

Further, a method for discharging the water vapor without providing degassing means when an article including a cellulose fiber is molded (for example, refer to JP-A-10-29250). In this method, it is suggested to open the mold to form a gap of about 1 mm and to discharge the water vapor through the gap in the drying step. It is noted that the molding compound comprising 3 to 100 parts by weight of gluten as a binder and 20 to 150 parts by weight of water per 100 parts by weight of raw paper material is used.

In the method of molding by employing the mold provided with degassing means having micropores, if the cavity has a portion to mold a thin molded article or a narrow groove to mold a rib, it is necessary to increase flowability of the molding compound in the cavity by applying a high charging pressure in order to charge the molding compound into a cavity uniformly.

On the other hand, the molding compound charged in the cavity is heated and dried from the surface portion which is in contact with the wall of the cavity having a high temperature. Therefore, a solidified surface layer (hereinafter, referred to simply as "surface layer") is formed on the surface portion of the molding compound. But, since heat transfer is delayed in the center portion of the molding compound, the molding compound is in the flowable state with a relatively low viscosity in the center portion. Since the surface layer formed of the molding compound is soft in the form of thin film, the surface layer is easily fractured due to an increased charging pressure and the flowable molding compound in the center portion flows into micropores of the degassing means to close the micro pore. Namely, there is a problem that it becomes difficult to dry and solidify the molding compound rapidly because the discharge of the water vapor is inhibited.

Further, in order to shorten the period of time for drying the molding compound, it is necessary to set the temperature of the mold to not lower than 120° C., preferably not lower than 130° C. to facilitate the generation of the water vapor. However, in the method wherein the water vapor is discharged by opening the mold to form the gap of about 1 mm without providing the degassing means having micropores, the molding compound flows into the large gap of the mold and a flash is easily formed due to the water vapor pressure when the temperature of the mold is set to not lower than 120° C. Also, there is a tendency that a void is easily generated in the cavity because of the lack of the molding compound. The thickness of the molded article obtained by employing such a kind of a cellulose fiber is usually so thin that it is really disadvantageous if a flash or a void of about 1 mm is formed in such thin molded article.

On the other hand, when the temperature of the mold is not higher than 120° C., it is necessary to increase an adding amount of water to make gluten perform the binding property and to give flowability to the molding compound. However, even if the amount of water per the solid content of cellulose fiber and gluten is decreased, the molding compound has flowability and the flash is liable to be developed. Therefore, if the amount of water is large, there are problems that the flash is further easily formed and that the molding cycle may not be shortened because the temperature of the mold is low and the drying period of time becomes longer.

Namely, it is eagerly expected that the molding method can be conducted without providing the degassing means with micropores and without generating the flash wherein the water vapor can be discharged smoothly and reliably in a short period of time and the charging pressure can be increased.

(3) Mold

Hitherto, when a molded article is molded, the shape of a cavity of a mold is fabricated on the basis of the outer shape of the article to be obtained and the molding compound is charged into the cavity, followed by solidifying the molding compound.

Apart from the case wherein the surface is treated by forming an irregularity, the wall of the cavity in a general mold is made smooth by grinding or is made mirrorlike by mirror polishing in order for the charged molding composition is liable to flow.

When the molding compound is charged into the conventional cavity with a smoothed surface or mirrorlike surface, the molding compound is cooled from the interface between the wall of the cavity and the molding compound in the case that the molding compound comprises a thermoplastic resin. Therefore, as described above, there is formed a solidified surface layer at the surface portion of the molding compound and, the inner portion of the molding composition wherein heat transfer from the wall of the cavity is delayed is in the flowable state with a relatively low viscosity. Since the surface layer formed on the surface portion of the molding compound is adhesive to the cavity wall, the molding compound is charged as the fountain-flow as shown in FIG. 1 to provide a homogeneously molded article.

Namely, the molding compound C is charged into the cavity B of the mold A, there is formed the surface layer E at the surface of the molding compound in contact with the wall D of the cavity B. Since the surface layer 5 is adhesive to the wall D of the cavity B, the surface layer E does not slip on the surface of the wall D.

Then, when the molding compound is charged into the cavity B, the molding compound is solidified at the surface portion which is adjacent to the wall D first. However, since the inner porion of the molding compound which is apart from the wall D via the surface layer E has flowability and may flow, the molding compound at the top of the flowing molding compound flows toward the wall D of the cavity B to form the surface layer E successively. The formerly charged molding compound forms the portion of the molded article corresponding to the portion around the gate and the lately charged molding compound forms the inner portion and the front portion of the molded article.

In the case that the molding compound comprises a thermosetting resin, the surface layer is not formed at the surface portion of the molding compound and there is flowability from the inner portion to the front portion of the molding compound. Therefore, the molding compound is charged as the plug-flow, which means that the inner portion and the front portion of the molding compound flow at almost the same velocity theoretically to give a homogeneously molded article.

On the other hand, in the case that a molding compound obtained by kneading a cellulose fiber added with at least a water-soluble binder and a large amount of water is molded by a heated mold, the molding compound is dried and solidified at the same time when the molding compound is in contact with the wall of mold. And, the surface layer is formed at the surface portion of the molding compound in almost the same manner as in the case of the thermoplastic resin.

However, in this case, there is the water vapor at the interface between the formed surface layer and the wall of the cavity. The water vapor is generated from the large amount of water contained in the molding compound. Therefore, adhesion between the surface layer and the wall of the cavity is remarkably lowered. As the result, the surface layer is pulled or forced by the flowing molding compound due to the charging pressure and slips easily.

According to the phenomenon, there is a problem as described in the followings.

Namely, when the molding compound including a cellulose fiber, at least water-soluble binder and water are charged into the cavity having a ground or polished wall, the molding compound in the cavity flows in the manner of slip-flow as shown in FIG. 2, which means that mainly the surface layer flows while slipping. This is because the surface layer formed on the surface portion of the molding compound is less adhesive to the wall of the cavity.

The molding compound C charged in the cavity B of the mold A forms the surface layer E at the interface between the wall D of the cavity B and the molding compound. However, the surface layer E is less adhesive to the wall D of the cavity B, the surface layer E is pulled by the molding compound which flows with the charging pressure for example and, therefore, proceeds in the cavity while slipping on the surface of the wall D. As the result, the molding compound formerly charged in the cavity B forms the front portion of the molded article to be obtained. On the contrary, the molding compound lately charged forms the portion around the gate.

The phenomenon of the slip-flow may not be observed around all of the wall D of the cavity B. In case where the degree of the mirrorlike state on the wall of cavity varies depend on the portion of the wall, there are two portions existed, i.e. the portion where the surface layer is facilitating to slip and the portion where the surface layer is not liable to slip. Further, since the wall D of the practically manufactured cavity is not necessarily smooth, there are also two portions existed in this case. On the portion where the surface layer is facilitating to slip, the molding compound is charged with little resistance, the distance that the molding compound flows becomes long. On the portion where the surface layer is not liable to slip, on the contrary, there is a problem that the distance that the molding compound flows becomes short, resulting in a uneven charging since the flow rate of the molding compound becomes low.

Also, there is another problem that, near the completion of the charging, the portion where the flow of the molding compound is delayed begins to flow and forms a weld line with the formerly charged molding compound. There is further a problem that the molding compound at the weld line is not liable to be combined confirmly and the strength of the weld line is lowered to develop a crack when the mold is heated to a high temperature. This is because the front portion of the flowing molding compound is dried to some degree and fibers in the compound are difficult to entangle with each other in the weld line.

Further, if the flowing distance is long in case of a relatively large molded article, the formerly charged molding compound forms the front portion of the flowing molding compound by the slip-flow. Accordingly, when the front portion flows a long distance as it is, the front portion is dried to lose the flowability if the temperature of the mold is high. As the result, there are problems not only that the flow is stopped but also that the mechanical strength of the weld line is remarkably decreased and the obtained molded article becomes fragile because the dried molding compound is difficult to adhere and combine to each other at the weld line. Further, there is a problem that the obtained molded article has a void or a lacked portion therein when the flow is stopped during the step for forming the weld.

Namely, it is eagerly desired that the mold does not cause the slip-flow when the molding compound is charged.

BRIEF SUMMARY OF THE INVENTION

To solve the above-mentioned problem (1), in the present invention, the molding compound for making an article including a cellulose fiber is prepared by adding a long chain fatty acid salt of a non-alkali metal to a mixture obtained by adding at least starch and water to a cellulose fiber.

To solve the above-mentioned problem (2), in the molding process of the present invention, a molding compound prepared by kneading a cellulose fiber added with at least a water-soluble binder and water is charged into the cavity, which is formed by closing a stationary side and a movable side of the mold with a relatively high temperature while tightly closing the parting surfaces of both sides of the mold. Then, a fine gap between the both parting surfaces is formed by opening slightly the stationary side and the movable side in order to discharge therethrough the water in the molding compound after vaporizing the same. And, finally, the molding compound is dried and solidified.

For solving the above-mentioned problem (3), the mold used in the present invention has a flow resistance to the charging flow in the charging direction on at least a portion of the wall of the cavity. Then, the present invention uses a molding compound prepared by kneading a cellulose fiber added with at least a water-soluble binder and water. The molding compound is molded by charging the same into the cavity of the heated mold.

In order to solve the above-mentioned three problems (1) to (3) at the same time, the method for producing an article including a cellulose fiber of the present invention uses, as a molding compound, a mixture of a cellulose fiber added with a water-soluble binder such as starch and water. The molding compound further contains a long chain fatty acid salt of a non-alkali metal. And, the mold used in the present invention is a mold having a rough surface with flow resistance to the charging flow in the direction of the charging on at least a portion of the wall of its cavity. The water in the molding compound in the cavity of the mold is vaporized by keeping the mold at a temperature of 120 to 220° C. and discharged the resultant water vapor through a gap formed between the parting surfaces of the mold and, finally, the molding composition is dried and solidified.

While the novel features of the invention are set forth particularly in the appended claims, the invention, both as to organization and content, will be better understood and appreciated, along with other objects and features thereof, from the following detailed description taken in conjunction with the drawings.

Figure 1:
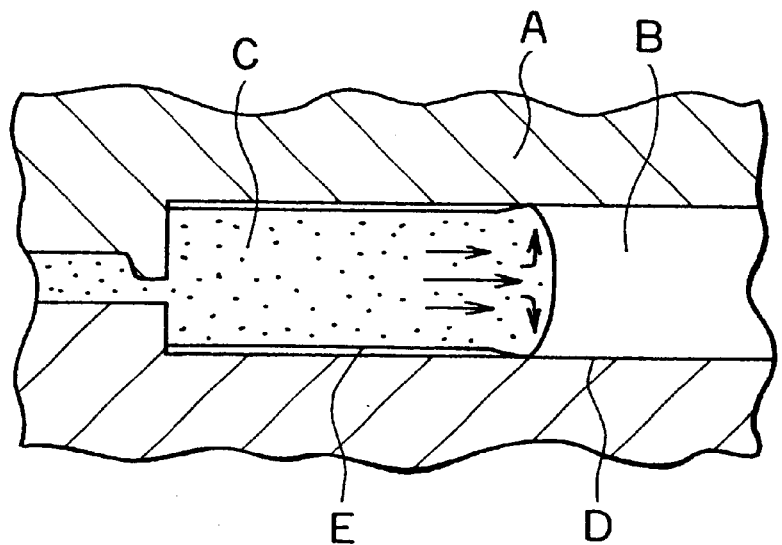
FIG. 1 is a partial sectional view of the cavity explaining the fountain-flow of the molding compound in the injection molding.
Figure 2:
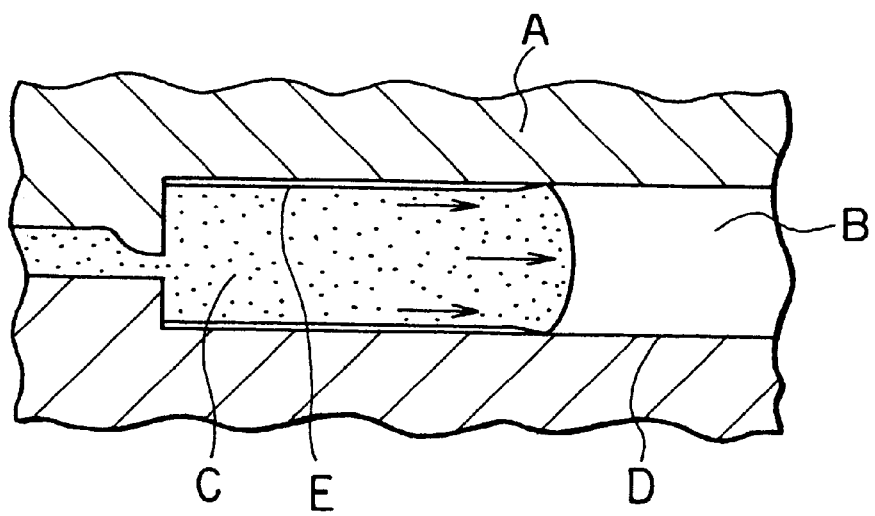
FIG. 2 is a partial sectional view of the cavity explaining the slip-flow of the molding compound in the injection molding.

DETAILED DESCRIPTION OF THE INVENTION (1) Embodiment 1

Embodiment 1 of the present invention is directed to a molding compound for making an article including a cellulose fiber, which is prepared-by mixing a cellulose fiber with at least starch, water and a long chain fatty acid salt of a non-alkali metal. In the present invention, the meaning of the word mixing includes kneading.

The cellulose fiber is in the finely divided state and, therefore, liable to disperse when mixed as a molding material and to make the surface of the obtained molded article very smooth. The molecular structure of the starch is similar to that of the cellulose fiber and, therefore, the starch facilitates to confirmly adhere and combine the cellulose fiber to make a homogeneously combined molded article. Further, since the starch functions as a binder efficiently, the obtained molded article has good strength and high rigidity and, therefore, is not liable to have warpage. Also, since the starch could not melt after the water is removed, the obtained molded article could be released from the mold of a high temperature with ease.

The long chain fatty acid salt of a non-alkali metal has surface activating property due to the nonpolar cite based on the long chain portion of the fatty acid salt and the polar cite based on the non-alkali metal portion of the fatty acid salt. Also, the long chain fatty acid salt of a non-alkali metal is water-insoluble and hydrophilic and, further, has lubricity both in the molten state and in the state of powder. Such long chain fatty acid salt of a non-alkali metal functions as internal release agent to improve workability in the kneading step to plasticize the molding compound by inhibiting the molding compound from adhere to the wall of the cavity, the die and the like. Further, even if the surface layer is formed at the surface portion of the molding compound by drying, the surface layer is not liable to adhere to the wall of the cavity due to the presence of the long chain fatty acid salt of a non-alkali metal. Therefore, in case where the water in the molding compound vaporized by the heated mold, the water vapor passes through between the surface layer and the wall of the cavity and can be discharged and degassed by the degassing means or from the parting surfaces of the mold. Further, the long chain fatty acid salt of a non-alkali metal exists on the surface of the molding compound to decrease frictional resistance between the compound and the wall of the cavity. As the result, the obtained molded article may be released without developing a crack.

The mixture of the cellulose fiber, starch and the long chain fatty acid salt of a non-alkali metal is in the form of solid or clay at ordinary temperature by being kneaded with water. When such mixture is molded by injection molding or compression molding while being charged in the mold of a high temperature, the mixture becomes flowable with a remarkably low viscosity to smoothly flow into a narrow or thin portion of the cavity. Also, when the molding compound is charged into the cavity, the surface portion is dried to form the surface layer. The surface layer is solidified while being always applied with the vapor pressure from inside and forced onto the wall of the cavity of the mold. Therefore, the size of the obtained molded article corresponds to that of the cavity and the molded article with neither shrinkage nor warpage may be given.

Further, the water added into the molding compound is vaporized immediately in the cavity of a high temperature and discharged. Since there is formed a void at the cite where the water is vaporized, the amount of added water influences directly on the density of the molded article to be obtained. For making a molded article which has a low density and is easily fractured, the amount of water may be increased. For making a molded article having a high density and high strength, the amount of water may be decreased.

The cellulose fiber of the present invention is obtained by pulverizing or finely dividing a paper material. As the paper material, there are, for example, papers such as waste newspapers, magazines, corrugated cardboards and the like, waste papers such as paperboards, scraps of cut papers, waste papers such as brokes from the paper forming process, and the like. The cellulose fibers may be obtained from these waste paper. Further, the cellulose fiber may be in the state of pulp. The pulp may be obtained from wood, cotton, hemp, straw or the like. These cellulose fiber is preferably facilitating to disperse to give a molded article superior in the smoothness of the surface. The fiber length of the cellulose fiber used in the present invention is not limited but is usually about 2 mm, preferably about 1 mm.

Since the main components such as the cellulose fiber, starch and the below-mentioned polyvinyl alcohol are biodegradable, the obtained molded article is also biodegradable. Also, the long chain fatty acid salt of a non-alkali metal decreases the adhesion property of the molding compound to the walls of any portion of the used apparatus to improve workability in the kneading step to plasticize the molding compound. Further, the long chain fatty acid salt of a non-alkali metal may make the water vapor discharged and degassed easily. By the above-mentioned roles, the molding cycle time may be shortened. In the step of releasing the molded article, the molded article can be easily released from the mold and development of crack can be inhibited because the long chain fatty acid salt has an effect to provide the surface of the molded article with lubricity. Further, the water makes it possible to uniformly knead the molding compound, and makes it easy to flow the molding compound in the mold and to charge the molding compound into the cavity.

It is preferable that 10 to 50% by weight (hereinafter, referred to as "%"), more preferably 20 to 40% of the starch is replaced by polyvinyl alcohol. If the starch is used with polyvinyl alcohol, the obtained molded article performs excellent toughness with no crack developed.

Although the molecular structure of polyvinyl alcohol is different from that of the cellulose fiber and starch, polyvinyl alcohol is compatible with starch and can combine the cellulose fiber because of the hydrophilic group with the same hydrophilicity as that of starch in the molecule. Further, due to the high molecular weight with a relatively long chain and no branched structure like starch, polyvinyl alcohol has high toughness and gives softness to the molded article if used as a binder with starch. Then, by replacing 10 to 50%, preferably 20 to 40% of the starch with polyvinyl alcohol, the molded article having excellent toughness and no crack can be obtained.

As the long chain fatty acid salt of a non-alkali metal, there are, for example, calcium stearate, magnesium stearate, zinc stearate, aluminium stearate, strontium stearate, calcium laurate, magnesium laurate, zinc laurate, aluminium laurate, strontium laurate and the like. These salts may be used alone or in an admixture of two or more. These salts are effective because they may be uniformly mixed easily with the cellulose fiber and starch and performs good smoothness both in the molten state and in the state of powder. These salts may improve processability by the lubricating property and releasing property due to the surface activating property of the salts. Among them, calcium stearate and zinc stearate are more preferable in view of the smoothness and the availability.

In view of the strength and shape keeping property of the molded article, flowability and kneading property of the molding compound and discharging property and degassing property of the water vapor, the molding compound is prepared by the following steps of: mixing 50 to 90 parts by weight of the cellulose fiber and 10 to 50 parts by weight of starch to obtain a mixture X, mixing 50 to 200 parts of water and 100 parts of the mixture X to obtain a mixture Y, and mixing 100 parts of the mixture Y and 0.2 to 2.0 parts of the long chain fatty acid salt of a non-alkali metal. Namely, for preparing the molding compound of the present invention, the ratio of components of the intervening mixtures X and Y and the final molding compound are as follows;

(1) Mixture X: 50 to 90 parts of the cellulose fiber and 10 to 50 parts of starch Mixture Y: 100 parts of mixture X and 50 to 200 parts of water Molding compound of the present invention:
100 parts of mixture Y and 0.2 to 2.0, preferably 0.5 to 1.5 parts of the long chain fatty acid salt, more preferably (2) Mixture X: 60 to 80 parts of the cellulose fiber and 20 to 40 parts of starch Mixture Y: 100 parts of mixture X and 60 to 150 parts of water Molding compound of the present invention:
100 parts of mixture Y and 0.2 to 2.0, preferably 0.5 to 1.5 parts of the long chain fatty acid salt.

With respect to the mixture X, if the amount of the cellulose fiber is less than 50 parts or the amount of starch is more than 50 parts, it is disadvantageous because the molding can be conducted but the strength of the obtained molded article is remarkably decreased. If the amount of the cellulose fiber is more than 90 parts or the amount of starch is less than 10, it is also disadvantageous because the surface of the obtained molded article becomes rough and the strength of the obtained molded article is decreased.

Also, with respect to the mixture Y, if the amount of water is less than 50 parts, it is not preferable because, after kneading, it becomes difficult to maintain the shape of the molding compound in the form of pellet or tablet. Further, flowability of the molding compound is immediately decreased in the heated mold. On the other hand, if the amount of water is more than 200 parts, it is not preferable because the kneaded article to be obtained becomes in the form of clay with a low viscosity. Namely, when such kneaded article is molded by the usual molding method such as injection molding, compression molding or the like, the molding compound is liable to flow into the degassing means and the successive molding may not be conducted. Further, it takes a long time to dry and solidify the molding compound.

Also, with respect to the long chain fatty acid salt of a non-alkali metal, if the amount of the salt is less than 0.2 parts, it is not preferable due to the following reasons, i.e. that the effect as the lubricant is remarkably lowered and the molding compound is liable to adhere to the walls of any apparatus during the kneading step, that it takes a long time to degas the water vapor during the molding step, and that it is difficult to release the molded article from the mold if draft for the molded article is small and a crack is liable to be developed when the molded article is released from the mold. On the other hand, if the amount of the salt is more than 2.0 parts, it is not preferable because it becomes difficult to knead the molding compound in a short period of time by decrease in friction resistance between the molding compound and the walls of the apparatus. Further, the portion of the molded article in the cavity where the different portions of the flowing molding compound close becomes inferior in the mechanical strength.

(2) Embodiment 2

The embodiment 2 of the present invention relates to a method for molding an article including a cellulose fiber comprising the steps of: (a) preparing a molding compound by mixing a cellulose fiber with at least a water-soluble binder and water, (b) charging the molding compound into a cavity formed between a stationary side and a movable side of a mold heated to from 120 to 220° C. while tightly closing the parting surfaces of said sides each other, (c) forming a fine gap of 0.02 mm to 0.50 mm between said parting surfaces, (d) discharging the water vapor accumulated inside said cavity through said gap, and (e) drying and solidifying said molding compound. Preferably, the molding compound in embodiment 1 may be employed in this embodiment 2.

In the molding compound, a relatively large amount of water is contained per the solid content of the cellulose fiber and the water-soluble binder in order to improve flowability of the solid content of the molding compound in the mold at a high temperature. Therefore, when the molding compound is charged into the cavity in the tightly sealed and heated state, due to a charging pressure and flowability, the molding compound is comfirmly charged into the portion of the cavity where a thin portion of a molded article is formed or into a narrow groove of the cavity where a rib is molded.

Also, the surface portion of the molding compound charged in the heated cavity is dried and solidified by heat of the wall of the cavity to form a remarkably thin surface layer. The surface layer wraps the molding compound which has flowability with a low viscosity in the inner portion. Then, in case where the fine gap is formed between the parting surfaces after the molding compound is charged into the cavity to discharge the water vapor from the molding compound, the flowable portion of the molding compound never flow out from the fine gap and only the water vapor is discharged and removed immediately. At that time, if the fine gap of the parting surfaces, which is formed after charging of the molding compound into the cavity, is too large, the surface layer formed in the surface portion of the molding compound is liable to be destroyed due to a foaming pressure caused by the water vapor. Further, the flowable portion of the molding compound is liable to flow out from the gap with the water vapor, resulting in development of a void or a flash in the obtained molded article. Therefore, the inventors of the present invention has confirmed that the upper limit of the width of the fine gap is 0.50 mm, preferably 0.30 mm. Further, if the opening of the fine gap is insufficiently small, the molding compound in the cavity is liable to expand and adhere tightly to the wall of the cavity due to the water vapor pressure. In this case, the water vapor is not liable to discharge and the drying period of time is extended. Also, it has been confirmed that the lower limit of the width of the fine gap is 0.02 mm, preferably 0.05 mm.

If the fine gap is formed between the parting surfaces, the charging pressure in the cavity decreases and the molding compound may expands to some extent. But the expanding pressure is not so high that the surface layer is not torn. The surface layer may keep wrapping the molding compound which has flowability with a low viscosity in the center portion.

Further, though a large amount of the water vapor is produced from the molding compound, the surface layer formed at the surface portion of the molding compound is not tightly adhered to the cavity wall. The water vapor flows between the wall of the cavity and the surface layer along the wall of the cavity. The water vapor is discharged easily and immediately to outside of the mold without providing any degassing means even if the gap formed between the parting surfaces is small. This makes it possible to dry and solidify the molding compound in a short period of time, resulting in shortening of the molding cycle time.

In the present invention, the temperature of the stationary side and the movable side of the mold is preferably 120 to 220° C. to shorten the drying and solidifying period of time from the viewpoint of the formation of the surface layer at the surface portion of the molding compound, the generation of the water vapor from the molding compound, the strength of the water vapor pressure in the cavity, and the like. However, if the weight ratio of water to the solid content is relatively large, for example 10/15, the viscosity of the molding compound is low and the molding compound is liable to foam since the amount of the generated water vapor is large. In this case, even if the width of the fine gap is relatively narrow, for example 0.02 to 0.50 mm, the molding compound does not flow out by the foaming pressure. For making an excellent molded article without flash by discharging only the water vapor immediately, the temperature of the mold is preferably controlled to a lower side and the width of the fine gap is preferably controlled to a small side.

On the contrary, if the weight ratio of water to the solid content is relatively small, for example 10/4, flowability of the molding compound is low and the amount of the water vapor is small. In this case, for obtaining an excellent molded article by discharging the water vapor immediately through the relatively narrow fine gap of 0.02 to 0.50 mm, the temperature of the mold is preferably high and the fine gap is preferably large. The inventors have investigated influence of the formation of the fine gap between the parting surfaces on the thickness of the molded article. Since the surface layer is already formed at the completion of the charging of the molding compound and regulates the outer shape of the molded article, there was no worse influence observed. Even if the thickness of the molded article is changed to some extent, the change is corrected because the molded article is usually released from the mold after clamping the mold with a normal clamping force in the molding step.

In the present molding method, the surface layer is formed at the surface portion of the molding compound and the inner portion of the molding compound is kept in the flowable state. Therefore, it is effective to shorten the allowable period of time from the time when the charging of the molding compound is completed to the time when the fine gap is formed. It is not preferable to extend the allowable period of time because the water vapor pressure in the cavity is increased and is liable to flow out suddenly to cause foaming, resulting in the generation of a void in the molded article if the fine gap is formed between the parting surfaces.

The allowable priod of time is effected by not only the content of water in the molding compound, the width of the fine gap between the parting surfaces, and the period of time required for charging the molding compound but also the temperature of the mold. The temperature of the mold is preferably 120 to 220° C. And, the allowable period of time is preferably within 5 seconds when the temperature of the mold is not higher than 130° C. and is preferably within 1 second when the temperature of the mold is not lower than 200° C.

Further, in the present invention, it is preferable that, after the step (d) of discharging the water vapor accumulated inside the cavity through the fine gap and before the step (e) of drying and solidifying said molding compound, the cycle of the step of closing again the parting surfaces tightly and the step of opening the parting surfaces is conducted for at least one time.

In the method for drying and solidifying the molded article only by discharging the water vapor in the cavity, when the fine gap is formed between the parting surfaces, an opening corresponding to the fine gap is also formed between the surface layer and the wall of the cavity. Therefore, the molding compound expands by the water vapor pressure and the surface layer adheres onto the cavity wall, resulting that the flowing path of the water vapor is closed to extend the drying and solidifying period of time. Further, the shape of the obtained molded article may be influenced. Then, by closing again tightly the parting surfaces again to compress the molding compound and opening the parting surfaces after forming the fine gap in the step (c), the fine gap can be formed again. Namely, by repeating the cycle of the step of closing again the parting surfaces tightly and the step of opening the parting surfaces to discharge and removing the water vapor, drying and solidifying are conducted efficiently and promptly.

When forming the fine gap between the parting surfaces, it is effective that elastic body such as spring, rubber, polyurethan or the like is employed as supplementary means because the fine gap can be formed confirmly and rapidly. The elastic body is used as follows. For example, by providing the elastic body onto the stationary side or the movable side of the mold, the elastic body holds the elastic force by being compressed when the parting surfaces are closed tightly. The elastic force is used as supplementary force to open the parting surfaces when the parting surfaces are opened.

As the water-soluble binder, there are, for example, starch, carboxymethyl cellulose and the like.

The molded article obtained by the above-mentioned method of embodiment 2 is thin and light in the weight and has high rigidity and neither warpage nor shrinkage. Further, the molded article is heat-resistant and non-electrostatic, and does not generate dust and does not absorb the same from outside. In addition, the molded article is decomposed or degraded in the earth within 1 to 2 weeks by bacterial action.

(3) Embodiment 3

The embodiment 3 of the present invention relates to a method for molding an article including a cellulose fiber comprising the steps of: (i-1) preparing a molding compound by mixing a cellulose fiber with at least a water-soluble binder and water, (ii-1) charging said compound into a cavity of a heated mold wherein the wall of the cavity has at least a portion resistant to the charging flow in the charging direction, (iii-1) vaporizing the water in said molding compound, and, (iv-1) discharging a resultant water vapor to solidify said molding compound.

As described above, though the solidified surface layer formed at the surface portion of the molding compound in contact with the wall of the cavity is not tightly adhered to the wall of the cavity, the wall has resistance to the charging flow in the charging direction (hereinafter, referred to as "flow resistance"). Therefore, the molding compound is charged in the manner of fountain-flow, not as the slip-flow. The molding compound existing in the cavity of a high temperature via the surface layer is not dried and has flowability with a low viscosity. And, a flowing phase, which flows along the surface layer formed at the surface portion of the charged molding compound, is formed. This is because the surface layer is remarkably thin and thermal conductivity thereof is lowered. Therefore, the molding compound can flow a relatively long distance with ease. Also, since the surface layer is remarkably thin, the flowing distance can be enlonged even if the molded article is thin.

The front of the flowing molding compound is replaced by the new molding compound which flows from the inner portion of the molding compound. The front is not dried completely. For example, even if a pin to form a hole or a window in the molded article exists in the cavity, one portion of the molding compound and another portion of the molding compound are joined and melted and combined easily with each other at the weld line formed by the pin. Namely, there is no decrease in the mechanical strength of the obtained molded article. In addition thereto, formerly charged molding compound forms a portion of the molded article around the gate and lately charged molding compound forms inner and end portions of the molded article, the molded article having homogeneous mechanical strength.

Namely, the present invention relates to a method for molding an article including a fibrous paper material, comprising the steps of: (i-2) preparing a molding compound by mixing a cellulose fiber with at least a water-soluble binder and water, (ii-2) heating a mold into which the molding compound is charged to 120 to 220° C., (iii-2) charging said compound into a cavity of a mold wherein the wall of the cavity has at least a portion resistant to the charging flow in the charging direction to form a solidified surface layer sequently at the interface between the wall of the cavity and the molding compound, the layer continuing in the charging direction, (iv-2) vaporizing the water in the molding compound, and (v-2) discharging a resultant water vapor to solidify the molding compound.

According to the method, the surface layer formed at the surface portion of the molding compound in contact with the wall of the cavity is not liable to slip on the wall of the cavity even if the surface layer is not adhesive to the cavity wall. As same as in the case of the fountain-flow, the surface layer is formed at the interface between the wall of the cavity and the molding compound sequently in the charging direction. Therefore, a molded article which does not have a crack and is not liable to be fractured can be obtained.

In the mold used in the method for molding an article including a cellulose fiber of the present invention, the wall of the cavity has the flow resistance in the charging direction as described above. In other words, the surface of the wall of the cavity is partially rough. The cavity is formed between a stationary side and a movable side of the mold.

By the rough surface with the flow resistance in the charging direction, the occurrence of slip of the surface layer at the surface portion of the molding compound may be inhibited. The rough surface on the wall of the cavity may be formed effectively by, for example, embossing the surface of the wall of the cavity to form a texture, embedding a wire gauze on the surface of the wall of the cavity, forming an irregularity or pattern whose cross section is in the form of sawtooth, by adhering abrasive grain on the surface of the wall of the cavity.

Also, to form a flow resistance in the charging direction, the resistance is provided on the wall of the cavity in the radial direction from the point facing the gate. The molding compound is charged from the gate.

Further, the rough surface may be formed on the whole surface of the cavity wall, i.e. the wall portions constituted by both of the stationary side and the movable side. Or the rough surface may be formed on either the wall portion forme by the stationary side or the wall portion formed by the movable side.

(4) Embodiment 4

The embodiment 4 of the present invention relates to a method for molding an article including a cellulose fiber, which comprises the above-mentioned embodiments 1 to 3. In concrete, the embodiment 4 is directed to a method for molding an article including a cellulose fiber comprising the steps of: (A) preparing a molding compound by mixing 50 to 100 parts by weight of the cellulose fiber and 10 to 50 parts by weight of a water-soluble binder to obtain a mixture X, mixing 50 to 200 parts of water and 100 parts of the mixture X to obtain a mixture Y, and mixing 100 parts of the mixture Y and 0.2 to 2.0 parts of the long chain fatty acid salt of a non-alkali metal, (B) forming a rough surface resistant to the charging flow on at least a portion of a wall of a cavity in a mold in the charging direction, (C) charging the molding compound into the cavity heated to 120 to 220° C. while tightly closing parting surfaces of the mold, (D) forming a fine gap of 0.02 to 0.50 mm between the parting surfaces, and (E) discharging a water vapor generated in the cavity through the fine gap to dry and solidify the molding compound.

By the above-mentioned method, a homogeneously molded article with good appearance and sufficient mechanical strength can be obtained. Further, a molded article not liable to be fractured can be obtained in a short period of time. The cycle time of the molding can be shortened.

Since the main components of the molding compound used in the present invention such as the cellulose fiber, starch as binder and, if necessary, polyvinyl alcohol replacing a part of starch are water-soluble, biodegradable and non-electrostatic, the obtained molded article also becomes biodegradable and non-electrostatic. If being kneaded with water, the molding compound has flowablity with a remarkably low viscosity at a high temperature. Therefore, the molding compound does not adhere to the wall of the cavity during the kneading and can be discharged smoothly out from the cavity of the mold during the molding. Also, after the charging, the molding compound is dried from the surface portion first to form the thin surface layer. Since the surface layer does not adhere to the cavity wall, the molding compound does not adhere to the wall of the cavity and is pressed onto the wall of the cavity by the water vapor pressure from inside. Thereby, apparent size of the obtained molded article is corresponded to the size of the cavity and the transferring property is good. There is no occurrence of shrinkage and crack in the molded article. Further, added water is rapidly converted to water vapor in the cavity of a high temperature and the water vapor passes through the interface between the surface layer and the wall of the cavity to be discharged via the fine gap between the parting surfaces.

EXAMPLES 1 to 10 and COMPARATIVE EXAMPLES 1 to 4

Figure 3:
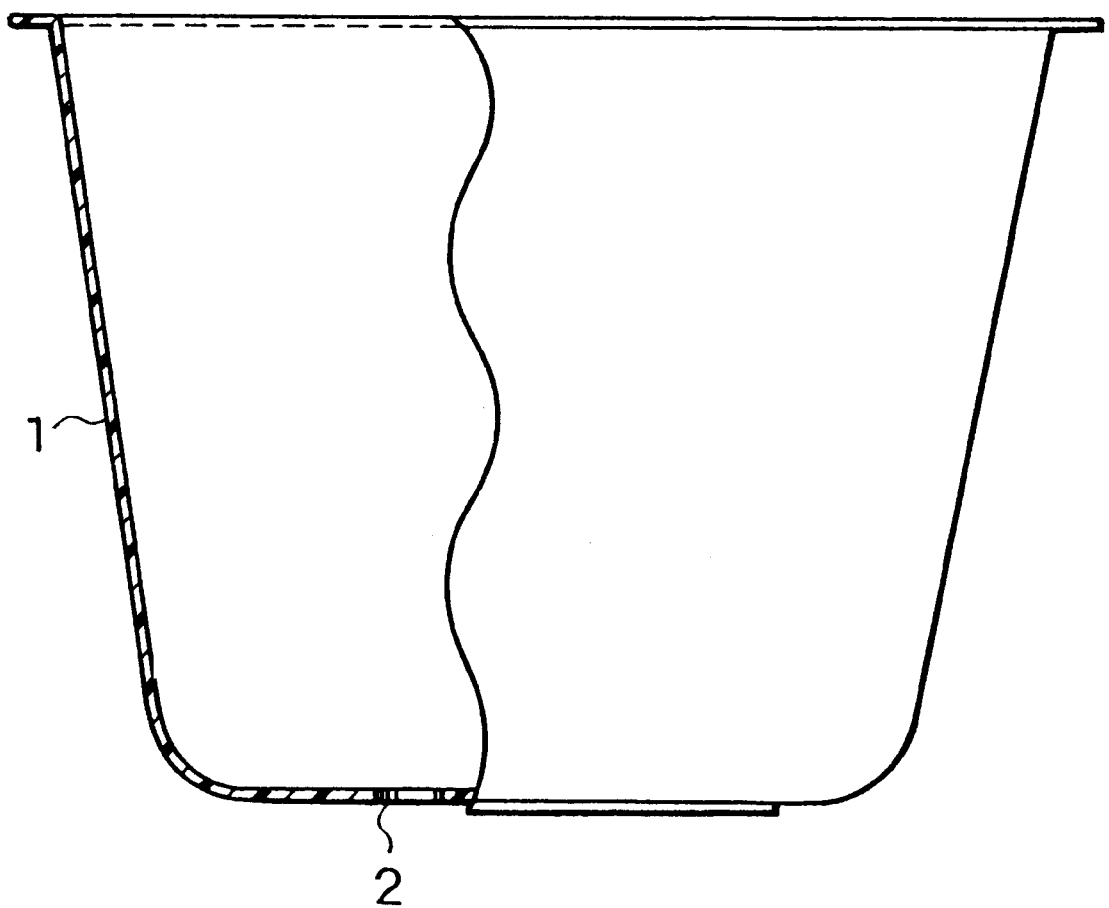
FIG. 3 is a partial cutaway side view of the seed-raising container which is molded by using the molding compound in examples of the present invention.

The embodiment 1 of the present invention is explained in the followings by exemplifying the case of the molding compound for making a seed-raising container as shown in FIG. 3. FIG. 3 is a partially cutaway side view of the seed-rasing container. Numeral 1 represents container body and numeral 2 represents an outlet.

To prepare the molding compound for molding the container body 6, a sliced powder formed during the fabrication of a milk package was used as the cellulose fiber. A corn starch under the name of Corn Y available from OJI CORN STARCH CO.,LTD. was used as starch. And, NM-14 available from NIPPON GOHSEI CO.,LTD. was used as polyvinyl alcohol (hereinafter, referred to as "PVA"). As the long chain fatty acid salt of an non-alkali metal (hereinafter, referred to as "metallic soap"), zinc stearate (hereinafter, referred to as "St-Zn"), ballium stearate (hereinafter, referred to as "St-Ba"), zinc laurate (hereinafter, referred to as "La-Zn") were used. These components were mixed according to the mixing ratios shown in Table 1. These metallic soaps were reagents prepared for research by KISHIDA REAGENT CHEMICALS CO.,LTD.

The mixing ratio of the cellulose fiber to starch, which were solid contents of the molding compound, was 7:3 to obtain a mixture X. The mixing ratio of the mixture X to water was 10:7 or 10:10 to obtain a mixture Y. And, as the mixing ratio of the mixture Y to the metallic soap, 0.5 to 1.5 parts of the metallic soap was added to 100 parts of the mixture Y.

TABLE 1

| No. | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Mixing ratio (parts by weight) | | | | | | | | | | |
| Cellulose | 7 | 7 | 7 | 7 | 7 | 7 | 7 | 7 | 7 | 7 |
| Starch | 3 | 2.1 | 2.1 | 2.1 | 3 | 2.1 | 3 | 2.1 | 3 | 2.1 |
| PVA | — | 0.9 | 0.9 | 0.9 | — | 0.9 | — | 0.9 | — | 0.9 |
| Water | 7 | 7 | 7 | 7 | 7 | 7 | 7 | 7 | 10 | 10 |
| Metallic salt* | 1 | 1 | 0.5 | 1.5 | 1 | 1 | 1 | 1 | 1 | 1 |
|  | St-Zn | St-Zn | St-Zn | St-Zn | St-Ba | St-Ba | La-Zn | La-Zn | St-Zn | St-Zn |
| Torque (kgf/cm) | 90–95 | 95–100 | 100–105 | 90–95 | 95–100 | 100–105 | 90–95 | 95–100 | 50–55 | 53–57 |
| Adhesion property** | | | | | | | | | | |
| at release | 1 | 1 | 2 | 1 | 1 | 1 | 1 | 1 | 2 | 2 |
| at drying | 2 | 2 | 2 | 2 | 2 | 2 | 2 | 2 | 2 | 2 |

*The mixing ratio of the metallic salt is the ratio per 100 parts of the main components, i.e. cellulose, starch, PVA and water.
**The adhesion property is estimated as 1 if the compound can be released easily with a finger without remaining, 2 if the compound is adhered on the wall but can be released by a wire brush, and 3 if the compound is adhered on the wall and cannot be released.

First, the cellulose fiber, starch, the metallic soap and water were weighed one after another such that the total amount of them was 55 to 60 g and added into an one-liter beaker of a thermoplastic resin, stirred, and kneaded to plasticize to obtain the molding compound. The kneading was conducted for 5 minutes at a set temperature of 70° C. with a kneading rate of 100 rpm by using LABOPLAS-TOMILL 15-20 available from Kabushiki Kaisya TOYOSEIKI SEISAKUSYO. The resultant kneaded article was formed into a tablet having a diameter of 50 mm immediately after the kneading. The effective temperature during the kneading was 60 to 100° C., preferably 65 to 80° C. If the temperature was lower than 60° C., starch was gelatinized insufficiently and a homogeneous molded article was not be obtained. If the temperature was higher than 100° C., the molding compound began to be dried during the kneading.

Since the molding compound was biodegradable and contained a large amount of water, there was observed occurrence of mold after 7 to 10 days under a usual storage condition at 15° C. Then, to store the molding compound for a long period of time such as more than 10 days, it was preferable to add about 0.3% of antibacterial agent such as AMORUDEN SK-950 available from DAIWA Chemical Industries, Ltd. in the kneading step. But, in the examples, the antibacterial agent was not added because the storing period was short. The effect of the mixed molding compound on the kneading performance is explained in detail by referring Table 2.

TABLE 2

| No. | Com. Ex. 1 | Com. Ex. 2 | Com. Ex. 3 | Com. Ex. 4 |
|---|---|---|---|---|
| Mixing ratio (parts by weight) | | | | |
| Cellulose | 7 | 7 | 7 | 7 |
| Starch | 3 | 2.1 | 3 | 2.1 |
| PVA | — | 0.9 | — | 0.9 |
| Water | 7 | 7 | 10 | 10 |
| Metallic salt* | — | — | — | — |
| Torque (kgf/cm) | 95–100 | 105–110 | 53–57 | 55–60 |
| Adesion property** | | | | |
| at release | 2 | 2 | 2 | 2 |
| at drying | 3 | 3 | 3 | 3 |

*The mixing ratio of the metallic salt is the ratio per 100 parts of the main components, i.e. cellulose, starch,PVA and water.
**The adhesion property is estimated as in the same manner as in Examples 1 to 10.

It is understood that the kneading torque was increased slightly but the adhesion property to the walls of the kneading apparatus is hardly changed when PVA was used in combination with starch(referred to COMPARATIVE EXAMPLES 2 and 4, EXAMPLES 2 to 4, 6, 8 and 10). In EXAMPLES where the metallic soap is added, the adhesion property to the walls of the kneading apparatus is improved as compared with COMPARATIVE EXAMPLE. It is recognized that there is better effect to decrease the adhesion property when the amount of the metallic soap is large (refer to EXAMPLES 1 to 4). In case where the amount of water is increased, the kneading torque is remarkably decreased and the kneaded article becomes soft. The article can be peeled and taken neither only by a finger nor a wire brush simply (refer to COMPARATIVE EXAMPLES 3 and 4). However, by adding the metallic soap, the kneaded article can be peeled simply with the wire brush and the cleaning becomes easy even if the article is dried on the wall of the kneading apparatus (refer to EXAMPLES 9 and 10).

In the case of COMPARATIVE EXAMPLES 1 to 4, it is difficult to peel the dried portion of the kneaded article adhered on the wall by the wire brush and it is necessary to peel the dried portion with the wire brush after softening by dipping in hot water. With respect to the kind of the metallic soap, there is observed a slight difference of the kneading torque in the case of St-Ba and La-Zn as compared with St-Zn but the peeling property due to adhesion property to the wall is not different (refer to EXAMPLES 1, 2, 5 to 8).

Then, the seed-rasing container was molded by using the tablet obtained above.

As the molding machine, 50t-compression molding machine manufactured by MARUHITI STEEL WORKS CO.,LTD. was used. As the die, the mold having a degassing vent and degassing means to discharge the water vapor generated during the molding to outside of the die. Also, there was a fear that the molding compound flowed into the vent when the molding compound was charged into the cavity and the pressure in the cavity was not lower than 30 $kgf/mm^2$. An outlet for discharging an excess molding compound was provided on the parting surfaces of the mold which was the point where the finally charged molding compound stays at. The temperature of the mold was set to 160 to 200° C. The tablet was in the solid state at ordinary temperature but was softened to have a low viscosity instantaneously in the cavity by the heat and pressure. The tablet could be molded under a gauge pressure of 210 $kgf/mm^2$ as maximum and also under a gauge pressure of not higher than 5 $kgf/mm^2$.

The water vapor generated in the cavity was charged outside of the mold mainly via the degassing vent. And, since the completion of the discharging of the water vapor meant the completion of the drying of the molded article, the molded article could be released by opening the mold after the completion of the discharging of the water vapor.

In the followings, the effect of the above-described method to the obtained molded article is explained in detail in view of the drying period of time and occurrence of a crack by referring to Tables 3 and 4. The drying period meant the period from the time when the clamping of the mold was begun to the time when the discharging of the water vapor was completed. The rate of occurrence of crack meant the ratio of the number of the molded article with cracks to the number of all molded article, i.e. 30.

TABLE 3

| No. | Ex. 1 | Ex. 2 | Ex. 3 | Ex. 4 | Ex. 5 | Ex. 6 | Ex. 7 | Ex. 8 | Ex. 9 | Ex. 10 | Com. Ex. 1 | Com. Ex. 2 | Com. Ex. 3 | Com. Ex. 4 |
|---|---|---|---|---|---|---|---|---|---|---|---|---|---|---|
| Drying period (sec) | 13–18 | 14–20 | 15–35 | 13–18 | 14–18 | 14–20 | 14–20 | 15–22 | 20–25 | 20–25 | 18–45 | 18–40 | 35–60 | 35–60 |
| Average drying period | 16 | 16 | 20 | 16 | 16 | 16 | 17 | 17 | 22 | 21 | 28 | 26 | 43 | 40 |
| Rate of occurrence of crack (%) | 13.3 | 0 | 0 | 0 | 6.7 | 0 | 6.7 | 0 | 13.3 | 0 | 26.7 | 13.3 | 43.3 | 33.3 |

TABLE 4

| No. | Ex. 2 | Ex. 10 | Com. Ex. 2 | Com. Ex. 4 |
| --- | --- | --- | --- | --- |
| Temperature of the mold (° C.) | 160 | 160 | 160 | 160 |
| Drying period (sec) | 20–25 | 22–27 | 25–50 | 40–70 |
| Average drying period (sec) | 22 | 25 | 45 | 52 |
| Rate of occurrence of crack (%) | 0 | 0 | 6.7 | 6.7 |
| Temperature of the mold (° C.) | 200 | 200 | 200 | 200 |
| Drying period (sec) | 10–13 | 13–16 | 13–30 | 20–40 |
| Average drying period (sec) | 11 | 14 | 17 | 32 |
| Rate of occurrence of crack (%) | 0 | 13.3 | 23.3 | 90.0 |

From Table 3 wherein the temperature of the mold is 180° C. it is recognized that the addition of the metallic soap results in a short drying period and a low rate of occurrence of crack. The shortening of the drying period leads to the shortening of the molding cycle time and is remarkably advantageous for the molding step. If the water content of the molding compound is high, the molding compound becomes soft and it is difficult to discharge the water vapor, and crack is facilitating to develop (refer to COMPARATIVE EXAMPLES 3 and 4). However, by addition of the metallic soap, the drying period is shortened and the rate of occurrence of crack is decreased (refer to EXAMPLES 9 and 10).

The high temperature of the mold leads to the shortening of the drying period and, also, to the rapid generation of water vapor. Further, the high temperature results in the foaming due to the water vapor which is partially generated during the step of charging the molding compound and the occurrence of crack. But, by the addition of the metallic soap, the drying period can be shortened and the rate of occurrence of crack can be lowered (refer to Table 4). In the case of the molding compound having a high water content, when the temperature of the mold is 200° C., the occurrence of crack cannot be inhibited in spite of the addition of the metallic soap. Then, for achieving a stable production, the temperature of the mold is preferably lower than 200° C.

EXAMPLES 11 to 74 and COMPARATIVE EXAMPLES 5 to 24

With respect to the embodiment 2, a container in the form of disc with a rib in the base of 120 mm in diameter and 1 mm in thickness of the main portion was injection molded. In the rib, the thickness of the base was 0.7 mm, The thickness of the end portion was 0.5 mm, and the height was 10 mm.

Figure 4:
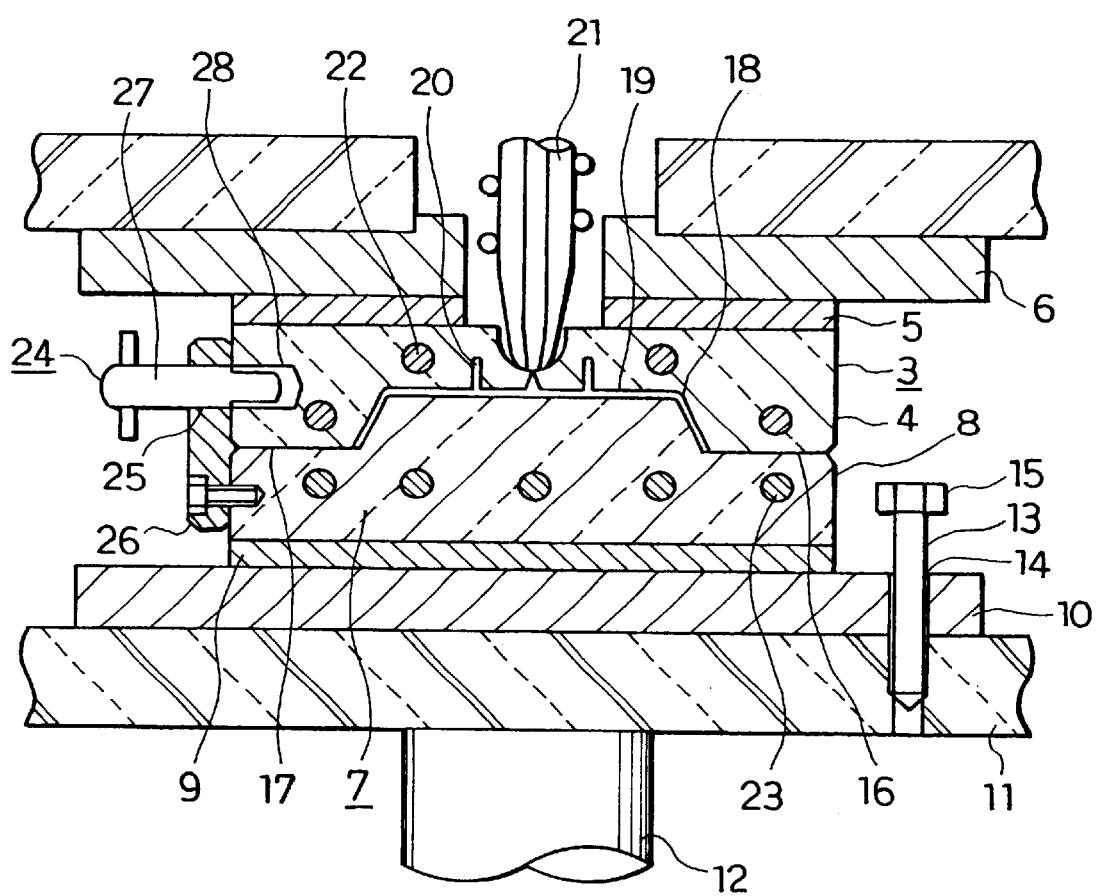
FIG. 4 is a partial secional view of the mold which is used in examples of the present invention.

The mold for injection molding the disc-like container with the rib is explained by referring to FIG. 4, which is a partially sectional view of the mold.

In FIG. 4, numeral 3 represents the stationary side of the mold which is constituted by the stationary clamping plate 6 onto the stationary retainer plate 4 via the thermal insulating plate 5. Numeral 7 represents the movable side of the mold which is constituted by the movable clamping plate 10 onto the movable retainer plate 8 via the thermal insulating plate 9. Numeral 11 represents the stationary clamping platen which moves forward and backward while linking with the clamping ram 12 of the molding machine. Numeral 13 represents the bolt for fitting the mold which is embedded on the stationary clamping platen 11. The idle end of the bolt is inserted into the pore 14 which is formed on the movable clamping plate 10 and the plate 10 can slide along the bolt 13.

For closing the stationary side 3 and the movable side 7, by moving the stationary clamping platen 11 with the ram 12, the movable clamping plate 10 is moved forward. The idle end of the bolt 13 is protruded from the movable clamping plate 10 (refer to FIG. 4). In the initial step for opening the stationary side 3 and the movable side 7, the stationary clamping platen 11 is moved backward by the ram 12. The movable clamping plate 10 is designed such that the head 15 of the bolt 13 is not in contact with the plate 10 if the distance that the platen 11 is moved backward is within 30 mm. Even if the clamping force is released by moving backward the stationary clamping platen 11 such that the movable clamping plate 10 can slide, the stationary side 3 and the movable side 7 are kept in the closed state with each other unless clamp-opening force is applied compulsory.

Numeral 16 represents the parting surface of the stationary side 3, numeral 17 represents the parting of the movable side 7, and numeral 18 represents the cavity which is formed by closing the stationary side 3 and the movable side 7 to close tightly the parting surfaces 16 and 17. The cavity has the portion 19 for molding the body of a molded article and the portion 20 for molding a rib and can mold the molded article in the form of disc. Numeral 21 represents the injecting nozzle, numeral 22 represents the cartridge heater for heating the stationary side 3, and numeral 23 represents the cartridge heater for heating the movable side 7. Numeral 24 represents the means for regulating the fine gap between the parting surfaces 16 and 17. One end of the regulating means is fitted on the movable retainer plate 8. The regulating means comprises the plate 26 for fitting the regulating pin with the inserting pore 25, the regulating pin 27 which is inserted into the pore 25, and the hole 28 provided on the stationary retainer plate 4. The hole is designed such that the head of the pin 27 is not in contact with the stationary retainer plate 4 when the pin 27 is inserted into the hole 28 of the stationary retainer plate 4.

When the diameter of the head of the regulating pin 27 is referred to "a" and the diameter of the hole 28 is referred to "b", in the state that the pin is inserted into the hall 28 such that the head of the pin is not in contact with the stationary retainer plate 4, the fine gap between the parting surfaces 16 and 17 is controlled to (b−a)/2. Then, by controlling the regulating pin 27 and the hole 28 to have specified diameters, the width of the fine gap can be decided.

The function of the mold is explained in the followings.

In the step of charging the molding compound into the cavity 18, by moving forward the stationary clamping platen 11 with the ram 12 to close the stationary side 3 and the movable side 7, the parting surfaces 16 and 17 are tightly closed each other to make the cavity 18 tightly closed. Then, when the molding compound is injected and charged into the cavity 18 from the injecting nozzle 21, the molding compound is uniformly charged into even the narrow portion such as the portion 20 for molding the rib by the charging pressure. Although the surface layer is formed at the surface portion of the molding compound that is in contact with the heated cavity 18, the inner portion of the molding compound is in the flowable state with a low viscosity. During such state is kept, the water vapor is generated and the inner pressure of the cavity 18 is increased by the water vapor pressure.

In the step of forming the fine gap by opening the parting surfaces 16 and 17 and discharging the water vapor to dry and solidify the molding compound, the clamping force of the movable side clamping plate 10 is released when the stationary clamping plate 11 is moved backward with the ram 12. Therefore, the movable clamping plate 10 can slide by the guidance of the bolt 13. However, the stationary side 3 and the movable side 7 are kept in the closed state. When the movable clamping plate 10 is slid along the bolt 13 and moved backward by the water vapor pressure in the cavity to open the stationary side 3 and the movable side 7, the parting surfaces 16 and 17 are opened to form the fine gap, the water vapor being discharged from the fine gap. But the distance that the movable clamping plate 10 can be moved backward is limited to the distance that the movable clamping plate 10 is moved till the head of the regulating pin 27 is closed in contact with the wall of the hole 28. Accordingly, the width of the fine gap formed between the parting surfaces is corresponded to the distance that the movable clamping plate 10 is moved backward, namely the half of the difference between the diameter of the hole 28 and the diameter of the regulating pin 27.

In the present invention, by using a mold opening mechanism of high accuracy instead of the regulating means 24, the fine gap may be formed by controlling the distance that the ram 12 is moved backward and by opening the parting surfaces for the same distance. However, the means for forming the fine gap is not limited thereto in the present invention.

In the molding compound used in the present invention, wood pulp available from AZUMI Filter CO.,LTD. was used as the cellulose fiber. A corn starch available from OJI CORN STARCH CO.,LTD. under the name of Corn Y and polyvinyl alcohol available from NIPPON GOHSEI CO., LTD. under the name of GOHSENOL NM-14 were used as water-soluble binder. Further, zinc stearate prepared by KISHIDA REAGENT CHEMICALS CO.,LTD. for research was used as the internal mold release agent. The molding compounds were prepared in the below-explained mixing ratios.

The molding compound A was prepared by adding 1 part of zinc stearate to 100 parts of the mixture of the cellulose fiber, starch, polyvinyl alcohol and water in the ratio of 7:2.1:0.9:4. The molding compound B was prepared by adding 1 part of zinc stearate to 100 parts of the mixture of the cellulose fiber, starch, polyvinyl alcohol and water in the ratio of 7:2.1:0.9:6. The molding compound C was prepared by adding 1 part of zinc stearate to 100 parts of the mixture of the cellulose fiber, starch, polyvinyl alcohol and water in the ratio of 7:2.1:0.9:10. Further, the molding compound D was prepared by adding 1 part of zinc stearate to 100 parts of the mixture of the cellulose fiber, starch, polyvinyl alcohol and water in the ratio of 7:2.1:0.9:15. It is noted that the ratios of the solid content to water were 10/4 in the molding compound A, 10/6 in the molding compound B, 10/10 in the molding compound C, 10/15 in the molding compound D.

If the ratio of water to the solid content is increased in the molding compound, the viscosity becomes lowered and the molded article to be obtained is liable to be foamed. Therefore, the temperature of the stationary side 3 and the movable side 7 was controlled to relatively low so that the molding compound does not flow out by the foaming pressure through the fine gap formed between the parting surfaces 16 and 17. In concrete, the temperature of the stationary side 3 and the movable side 7 was 200° C. for the molding compound A, 180° C. for the molding compound B, 160° C. for the molding compound C, and 130° C. for the molding compound D.

For preparing these molding compounds, the cellulose fiber, starch, polyvinyl alcohol, water and zinc stearate were weighed one after another into a 20-liter bucket of polyethylene so that the total amount of them was 1 kg, followed by stirring. Then, each of the stirred articles was extruded to form a pellet of about 5 mm in diameter and about 5 mm in length by a double screw kneading extruder of corotating type manufactured by Werner & Pfleiderer.

The diameter of the screw was 28 mm and the L/D was 32, and the kneading extruder was operated under the condition that the temperature of the cylinder and the die was 70° C. and the screw rotated at 200 rpm.

As the injection molding machine, the injection molding machine SH220 manufactured by Sumitomo Heavy Industries Co., Ltd. was used. In the machine, the maximum clamping force was 220 t, the maximum injection rate was 400 $cm^3$/sec, the maximum injection pressure was 2150 $kgf/cm^2$, the maximum rotation rate of the screw was 330 rpm, and the diameter of the screw was 50 mm.

As the molding condition in the injection molding machine, the set point of the clamping force was 100 t, the set point of the injection rate was 30 $cm^3$/sec, the injection pressure was 300 $kgf/cm^2$, the rotation rate of the screw was 100 rpm, and the metered amount of the molding compound in the cylinder was 13 mm (about 25 $cm^3$). The temperature of the cylinder was 70° C. at the center portion and 30° C. at the hopper side and the nozzle portion. The temperature of the mold was 130° C., 160° C., 180° C. or 200° C. as described above.

Then, by using the above-mentioned molding compounds and the injection molding machine, the containers in the form of disc were produced and estimated. The results thereof are shown in Tables 5 to 8.

After clamping the stationary side 3 and the movable side 7 to tightly close the parting surfaces, the regulating pin 27 of the regulating means 24 was adjusted to open the parting surfaces 16 and 17 for a specified width. Then, the molding compound was injected and, at the same time when the injection was completed, the clamping force was released to move backward the ram 12 for 10±5 mm.

When the ram 12 was moved backward, the movable side clamping plate 10 was moved backward by the water vapor pressure generated in the cavity 18 while being guided by the bolt 13 to open the parting surfaces 16 and 17. Then, the fine gap having a specified width was formed between the parting surfaces 16 and 17 by the regulating means 24. After completion of the discharging of the water vapor through the fine gap, the stationary side 3 and the movable side 7 were clamped to tightly close the parting surfaces 16 and 17 and, then, the molded article obtained by drying and solidifying the molding compound was released from the cavity 18. Each molded article obtained by opening the parting surfaces one time was referred to as Product M and the width of the fine gap, drying time and the estimation are shown in Tables 5 and 6.

The results in case where the molding compound A was used and the temperature of the stationary side 3 and the movable side 7 was 200° C. are shown in Table 5. The results in case where the molding compound B was used and the temperature of the stationary side 3 and the movable side 7 was 180° C. are shown in Table 5. The results in case where the molding compound C was used and the temperature of the stationary side 3 and the movable side 7 was 160° C. are shown in Table 6. The results in case where the molding compound D was used and the temperature of the stationary side 3 and the movable side 7 was 130° C. are shown in Table 6.

In Tables 5 to 8, the molded article was estimated as o if there was no occurrence of flash, appearance in the side of the molded article was good, and the preferable product was obtained. Also, the molded article was estimated as Δ if there was some subtle irregularity in the side of the molded article but the irregularity was easily removed, and the relatively preferable product was obtained. Further, the molded article was estimated as X if there was a flash formed in the side of the molded article, there was a void in the molded article and the worse product was obtained.

The drying period reveals the period between the point of time when the specified fine gap was formed by opening the parting surfaces 16 and 17 in order to begin the discharging of the water vapor and the point of time when the generation of the water vapor was completed, i.e. the time when the sound of the generating water vapor was disappeared.

Since the project area of each molded article of this example was about 110 cm$^2$, the movable side 7 could be moved backward enough by the water vapor pressure because the water vapor pressure with the mold of 180° C. became about 10 kgf/cm$^2$.

but the irregularity could be finished easily by an abrasive paper.

It is recognized that the temperature of the mold is effectively increased when the ratio of water to the solid content is small, and is effectively lowered when the ratio of water to the solid content is large for the appearance of the product.

On the other hand, in the case of Comparative Examples 5, 8, 11 and 14, the water vapor was not discharged even if the molded article was stood still for 300 seconds. When the mold was opened after 300 seconds, the molding compound was scattered by the water vapor pressure at the same time of the opening and the molded article could not be released. In Comparative Examples 6, 7, 9, 10, 12, 13, 15 and 16, a part of the molding compound was flowed into the fine gap by the water vapor pressure to form a flash and a void in the molded article.

After opening the parting surfaces 16 and 17 by the water vapor pressure in the cavity 18, forming the specified fine gap between the parting surfaces 16 and 17 by the regulating

TABLE 5

| 200° C. No. | Ex. 11 | Ex. 12 | Ex. 13 | Ex. 14 | Ex. 15 | Ex. 16 | Ex. 17 | Ex. 18 | Com. Ex. 5 | Com. Ex. 6 | Com. Ex. 7 |
|---|---|---|---|---|---|---|---|---|---|---|---|
| Width of fine gap (mm) | 0.02 | 0.03 | 0.05 | 0.10 | 0.20 | 0.30 | 0.40 | 0.50 | 0 | 0.70 | 1.00 |
| Drying period (sec) | 60 | 45 | 30 | 18 | 17 | 16 | 15 | 14 | ≧300 | 13 | 13 |
| Estimation | ○ | ○ | ○ | ○ | ○ | ○ | ○ | Δ | — | X | X |

| 180° C. No. | Ex. 19 | Ex. 20 | Ex. 21 | Ex. 22 | Ex. 23 | Ex. 24 | Ex. 25 | Ex. 26 | Com. Ex. 8 | Com. Ex. 9 | Com. Ex. 10 |
|---|---|---|---|---|---|---|---|---|---|---|---|
| Width of fine gap (mm) | 0.02 | 0.03 | 0.05 | 0.10 | 0.20 | 0.30 | 0.40 | 0.50 | 0 | 0.70 | 1.00 |
| Drying period (sec) | 70 | 50 | 35 | 20 | 18 | 17 | 17 | 15 | ≧300 | 15 | 15 |
| Estimation | ○ | ○ | ○ | ○ | ○ | ○ | Δ | Δ | — | X | X |

TABLE 6

| 160° C. No. | Ex. 27 | Ex. 28 | Ex. 29. | Ex. 30 | Ex. 31 | Ex. 32 | Ex. 33 | Ex. 34 | Com. Ex. 11 | Com. Ex. 12 | Com. Ex. 13 |
|---|---|---|---|---|---|---|---|---|---|---|---|
| Width of fine gap (mm) | 0.02 | 0.03 | 0.05 | 0.10 | 0.20 | 0.30 | 0.40 | 0.50 | 0 | 0.70 | 1.00 |
| Drying period (sec) | 90 | 60 | 45 | 22 | 20 | 19 | 1.8 | 1.8 | ≧300 | 17 | 17 |
| Estimation | ○ | ○ | ○ | ○ | ○ | Δ | Δ | Δ | — | X | X |

| 130° C. No. | Ex. 35 | Ex. 36 | Ex. 37 | Ex. 38 | Ex. 39 | Ex. 40 | Ex. 41 | Ex. 42 | Com. Ex. 14 | Com. Ex. 15 | Com. Ex. 16 |
|---|---|---|---|---|---|---|---|---|---|---|---|
| Width of fine gap (mm) | 0.02 | 0.03 | 0.05 | 0.10 | 0.20 | 0.30 | 0.40 | 0.50 | 0 | 0.70 | 1.00 |
| Drying period (sec) | 150 | 100 | 60 | 35 | 30 | 28 | 26 | 25 | ≧300 | 25 | 25 |
| Estimation | ○ | ○ | ○ | ○ | ○ | Δ | Δ | Δ | — | X | X |

Apparent from Tables 5 and 6, preferable molded article could be obtained by shortening the drying period when the width of the fine gap was in the range of 0.02 to 0.50 mm. In the molded article of Examples 18, 25, 26, 32 to 34 and 40 to 42, there was subtle irregularity around the side portion which was in contact with the fine gap of the parting surfaces means 24, and discharging the water vapor through the fine gap for 5 seconds, the stationary side 3 and the movable side 7 were clamped instantaneously to tightly close the parting surfaces 16 and 17. Further, after opening the parting surfaces 16 and 17 to discharge the water vapor for 5 seconds, the cycle of the step of opening the parting surfaces 16 and 17 to discharge the water vapor again and the step of tightly close the parting surfaces was repeated till the sound of the generated water vapor was disappeared. Each molded article obtained by such process was referred to as Product N and the results thereof were shown in Tables 7 and 8.

The results in case where the molding compound A was used and the temperature of the stationary side 3 and the movable side 7 was 200° C. are shown in Table 7. The results in case where the molding compound B was used and the temperature of the stationary side 3 and the movable side 7 was 180° C. are shown in Table 7. The results in case where the molding compound C was used and the temperature of the stationary side 3 and the movable side 7 was 160° C. are shown in Table 8. The results in case where the molding compound D was used and the temperature of the stationary side 3 and the movable side 7 was 130° C. are shown in Table 8.

compound flowed into the fine gap by the water vapor pressure and a void due to the foaming in the molded article.

EXAMPLES 75 to 78 and COMPARATIVE EXAMPLE 25

The embodiment 3 of the present invention is explained by the following method wherein the a container in the form of cabinet of 150 mm in width, 300 mm in length, 30 mm in depth and 1.2 mm in thickness is made.

Figure 5:
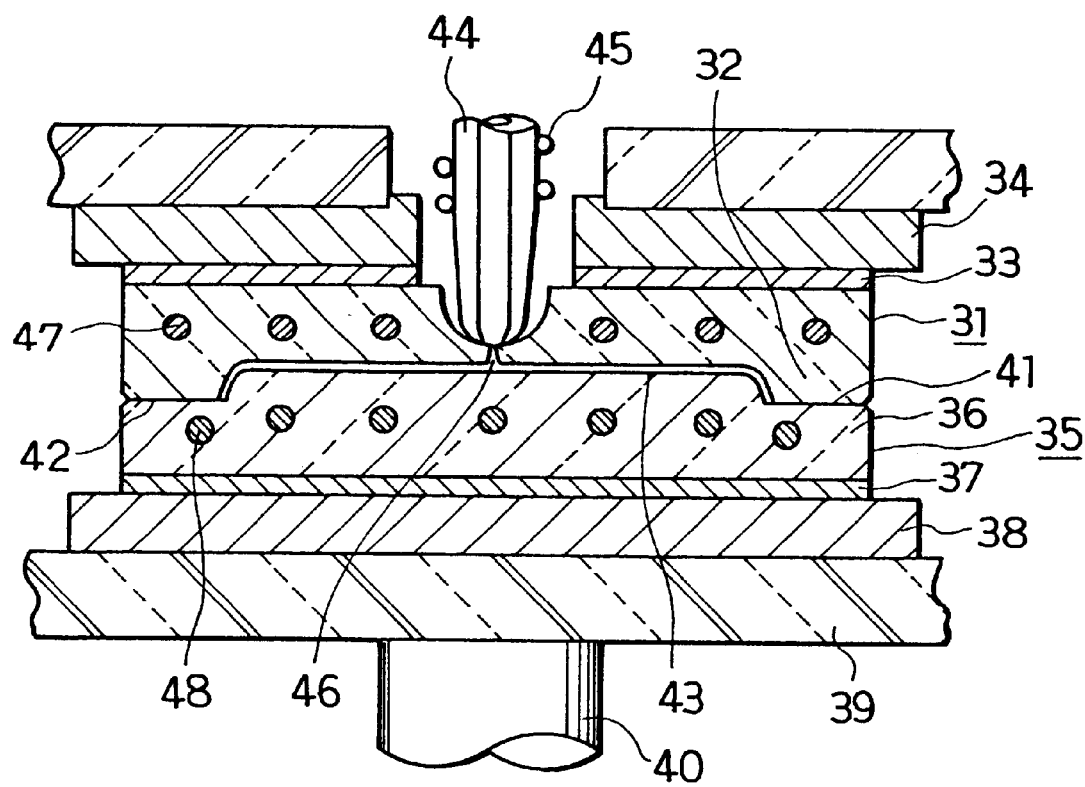
FIG. 5 is a partial secional view of the mold which is used in other examples of the present invention.

The mold used in this embodiment is shown in FIG. 5, and is the same as that used in the above-mentioned Example 11 except that the wall of the cavity is treated to be rough to have a portion resistant to the charging flow in the charging direction, i.e. the flow resistance. The injecting nozzle 44 is provided with the cooling tube 45 which prevents the nozzle 44 from being heated by heat transfer from the stationary side 31. The cavity 43 and the injecting nozzle 44 are

TABLE 7

| 200° C. No. | Ex. 43 | Ex. 44 | Ex. 45 | Ex. 46 | Ex. 47 | Ex. 48 | Ex. 49 | Ex. 50 | Com. Ex. 17 | Com. Ex. 18 |
|---|---|---|---|---|---|---|---|---|---|---|
| Width of fine gap (mm) | 0.02 | 0.03 | 0.05 | 0.10 | 0.20 | 0.30 | 0.40 | 0.50 | 0.70 | 1.00 |
| Drying period (sec) | 28 | 22 | 13 | 11 | 11 | 11 | 11 | 11 | 11 | 11 |
| Estimation | ○ | ○ | ○ | ○ | ○ | ○ | ○ | Δ | x | x |
| 180° C. No. | Ex. 51 | Ex. 52 | Ex. 53 | Ex. 54 | Ex. 55 | Ex. 56 | Ex. 57 | Ex. 58 | Com. Ex. 19 | Com. Ex. 20 |
| Width of fine gap (mm) | 0.02 | 0.03 | 0.05 | 0.10 | 0.20 | 0.30 | 0.40 | 0.50 | 0.70 | 1.00 |
| Drying period (sec) | 32 | 24 | 15 | 13 | 13 | 13 | 13 | 13 | 13 | 13 |
| Estimation | ○ | ○ | ○ | ○ | ○ | ○ | Δ | Δ | x | x |

TABLE 8

| 160° C. No. | Ex. 59 | Ex. 60 | Ex. 61 | Ex. 62 | Ex. 63 | Ex. 64 | Ex. 65 | Ex. 66 | Com. Ex. 21 | Com. Ex. 22 |
|---|---|---|---|---|---|---|---|---|---|---|
| Width of fine gap (mm) | 0.02 | 0.03 | 0.05 | 0.10 | 0.20 | 0.30 | 0.40 | 0.50 | 0.70 | 1.00 |
| Drying period (sec) | 40 | 30 | 21 | 16 | 15 | 15 | 15 | 15 | 15 | 15 |
| Estimation | ○ | ○ | ○ | ○ | ○ | Δ | Δ | Δ | x | x |
| 130° C. No. | Ex. 67 | Ex. 68 | Ex. 69 | Ex. 70 | Ex. 71 | Ex. 72 | Ex. 73 | Ex. 74 | Com. Ex. 23 | Com. Ex. 24 |
| Width of fine gap (mm) | 0.02 | 0.03 | 0.05 | 0.10 | 0.20 | 0.30 | 0.40 | 0.50 | 0.70 | 1.00 |
| Drying period (sec) | 80 | 50 | 30 | 25 | 23 | 22 | 22 | 22 | 22 | 22 |
| Estimation | ○ | ○ | ○ | ○ | ○ | Δ | Δ | Δ | x | x |

Apparent from Tables 7 and 8, preferable molded article could be obtained by shortening the drying time when the width of the fine gap was in the range of 0.02 to 0.50 mm. In the molded article of Examples 50, 57, 58, 64 to 66, and 72 to 74, there was subtle irregularity around the side portion which was in contact with the fine gap of the parting surfaces but the irregularity could be finished easily by the abrasive paper or the like.

On the other hand, in the case of Comparative Examples 17 to 24, there were formed a flash due to the molding combined at the gate 46 and the opening of the gate 46 faces the center of the wall of the cavity 43. The temperature of the stationary side 31 and the movable side 35 are kept in the range of 120 to 220° C.

The molding compound used is explained. As the cellulose fiber, a linter pulp from cotton available from AZUMI Filter CO.,LTD. was used. The linter pulp is in the form of powder with a fiber length of not longer than 0.3 mm, and is liable to entangle with each other. It is advantageous that the molding compound comprising the linter pulp can be kneaded uniformly. The water-soluble binder, polyvinyl alcohol and the mold release agent were the same as that used in Example 11. And, the molding compound obtained by adding 1 part of the mold release agent to 100 parts of a mixture of the cellulose fiber, starch, polyvinyl alcohol and water at the ratio of 7:2.1:0.9:7.

The molding compound was prepared and pelletized in the same manner as in Example 11 and a container in the form of cabinet was injection molded by the mold shown in FIG. 5.

The same injection molding machine was used in the same manner as in Example 11 except that the injection rate was 150 cm$^3$/sec, the metered amount of the molding compound in the cylinder was 45 mm (about 90 cm$^3$), and the temperature of the mold was 180° C.

After the parting surfaces 41 and 42 were tightly closed by clamping the stationary side 31 and the movable side 35, the molding compound was injected and charged into the cavity 43 from the gate 46. After completion of the charging, the clamping force was released and controlled to zero. When the clamping force became zero, the parting surfaces 41 and 42 were opened to form the fine gap by the water vapor pressure. The water vapor generated in the cavity 43 was discharged and removed from the fine gap between the parting surfaces 41 and 42. After completion of the charging, the water vapor was stopped generating within about 30 seconds to complete the drying of the molding article. Further, after the completion of the water generation, the parting surfaces 41 and 42 were kept in the open state with the fine gap for about 5 seconds. Then, after clamping the stationary side 31 and the movable side 35 to tightly close the parting surfaces 41 and 42, the molded container was released from the mold.

A rough surface was formed on the wall of the cavity 43 to make the flow resistance in the radial direction from the point that faces the gate 46 to the side wall of the cavity 43. The process for making the rough surface is explain in the followings. On the wall of the cavity 43, there are the wall portion constituted by stationary side 31 and the wall portion constituted by the movable side 35. Here, the rough surface was formed on both wall portions.

(a) Rough Surface by Forming a Texture (Example 75)

A texture was formed on the wall of the cavity 43 by TANAZAWA HAKKOSHA CO. ,LTD. The irregularity of the texture on the wall of the cavity was measured by a surface roughness gage. The average Ra was 7.2 $\mu$m and the average Rmax was 47 $\mu$m. The roughness of the texture was corresponded to the roughness of #600 abrasive paper. The flow resistance was produced by the irregularity due to the texture and prevents the surface layer from slipping. However, it is regarded that the convex of the texture prevents the surface layer from slipping because the molding compound flows into the concave of the texture and the concave was filled with the molding compound in several shots. Since the rough surface, mainly the convex of the texture is transferred onto the molded article to be obtained, a micro pore is formed on the molded article. However, the surface of the molded article is remarkably smoother than the rough surface A. In this process, the rough surface can be formed only by sand blast onto the cavity wall. This process is remarkably simple as compared with the process for forming a rough surface by embedding a wire gauze, the process for forming a rough surface in the form of sawtooth.

(b) Rough Surface in the Form of Wire Gauze (Example 76)

A rough surface was formed on the wall of the cavity 43 by adhering and fixing a wire gauze of stainless steel with 200 mesh by an electroforming mold with nickel. A flow resistance was formed by the irregularity of the wire gauze and might prevent the surface layer from slipping. The prevention of the slip was carried out in the same manner as in the case of the rough surface A and was achieved because a wire which constituted the wire gauze was fitted into the surface layer.

Since a minute pattern due to the wire of the wire gauze was transferred onto the surface of the molded article, the molded article may have good appearance with the pattern.

(c) Rough Surface in the Form of the Sawtooth (EXAMPLE 77)

Figure 6:
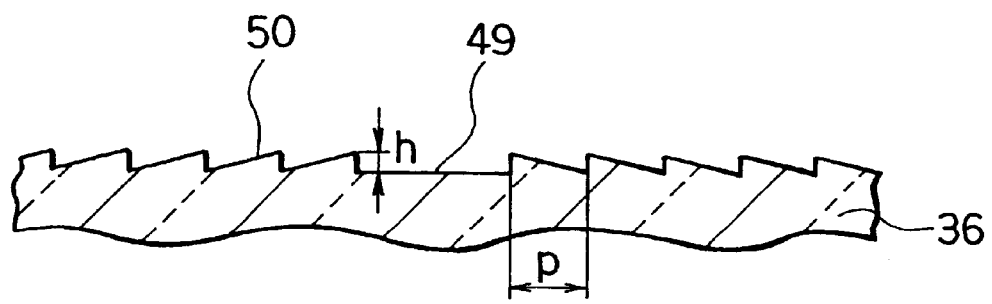
FIG. 6 is a partial sectional view showing the wall of the cavity in the mold of FIG. 5.

As shown in FIG. 6, a concentric circular pattern 50 having the form of sawtooth in the depth direction of 0.1 mm in height and 2.0 mm in the pitch was formed on the wall of the cavity 43. The pattern was formed radically from the portion of the wall of the cavity that faces the gate 46. The flow resistance was made by the difference in the height of the concentric circular pattern 50 having the form of sawtooth and prevented the slip of the surface layer. At the rough surface of EXAMPLE 77 in the form of sawtooth, the difference in the height was across to the flowing direction of the molding compound at a right angle. Although the convex of the rough surface of EXAMPLE 75, 76 or 78 mentioned below was fitted into the surface layer of the molding compound to inhibit the slip in the arbitrary direction. In the rough surface of EXAMPLE 77, the difference in the height formed a dam to inhibit the slip only in the flowing direction but the rough surface of EXAMPLE 78 functioned effectively.

Since a characteristic pattern was formed on the surface of the molded article as same as in the case of the rough surface of EXAMPLE 76, the molded article may have good appearance with the pattern.

(d) Rough Surface by Adhering (Example 78)

The cavity 43 was dewaxed after grinding a steel, followed by being activated. A water glass available from OKUNO CHEMICAL INDUSTRIES CO.,LTD. under the name of CRM-100 was applied onto the wall of the cavity 43 by spray method to form a film of about 20 $\mu$m. Then, the abrasive grain of a particle size of 10 to 20 $\mu$m was dispersed on the water glass film at a rate of about 3mg/cm$^2$ and dried in the air. Further, the surface was heat-treated to form the rough surface whose roughness was corresponded to the roughness of #600 abrasive paper. The flow resistance was made by the irregularity of the adhered abrasive grain and prevented the surface layer from slipping. The roughness of the rough surface of EXAMPLE 78 is similar to that of the rough surface of EXAMPLE 75. The prevention of the slip was achieved because the convex of the abrasive grain was fitted into the surface layer of the molding compound in the same manner as in case of the rough surface of EXAMPLE 78.

Although there were existed a large number of pores formed on the surface of the molded article due to the convex of the abrasive grain, other surface which was formed while being in contact with the water glass film was smooth and gloss.

(e) Ground Surface (Comparative Example 25)

By using a surface grinding machine fitted with the grinding wheel available from Kabushiki Kaisya TIKEN under the name of WA-60-K, a ground surface was formed on the wall of the cavity 43 at 1500 m/min in peripheral speed.

The appearance of the above-produced containers in the form of cabinet was estimated. As the results, when the rough surfaces of each EXAMPLES 75 to 78 were formed on the wall of the cavity 43, there were observed no occurrence of weld, the states of the rough surfaces were confirmly transferred and the homogeneously molded articles having remarkably good appearance were obtained. On the contrary thereto, in the case of the rough surface of COMPARATIVE EXAMPLE 25, there was observed a lot of welds and occurrence of crack in the weld portions. In addition, if the flow was stopped during the step of forming the weld, the charging into the weld portions was incomplete to give the molded article with a partial lack.

If the rough surface was formed on each of the wall portion constituted by the stationary side 31 or the wall portion constituted by the movable side 35, the same effect could be obtained at some extent. It was effective enough for making a molded article with a quiet portion. For example, when the rough surface of each EXAMPLES 75 to 78 was formed on the wall portion constituted by the movable side 35 the rough surface of COMPARATIVE EXAMPLE 25 was formed on the wall portion constituted by the stationary side 31, there was observed a small flowing mark due to the slip flow on the outer surface corresponding to the stationary side 31 but no occurrence of a large weld. Namely preferable molded article could be obtained.

EXAMPLE 79

The embodiment 4 of the present invention is explained by using the case where a biodegradable container in the form of cabinet having a width of 150 mm, a length of 200 mm, a depth of 30 mm and a thickness of 1.2 mm.

The molding compound used herein was prepared and pelletized in the same manner as in the above-mentioned EXAMPLE 11 except that the mixing ratio of the cellulose fiber, starch, polyvinyl alcohol and water was 7:2.1:0.9:6.5.

In preparing the molding compound, a part of initially added water was vaporized in the stirring step, the kneading step, pelletizing step and the like. Therefore, the pelletized molding compound was impregnated with water in an amount corresponding to that of the vaporized water to secure the amount of water and, then, injection molded in the form of tablet. The injection molding machine used therein was the same that used in EXAMPLE 11. The temperature of the cylinder was controlled to 70° C. and the temperature of the mold for tablet was controlled to 30° C. The amount of water for the impregnation was 30 g per 1 kg of the molding compound.

Figure 7A:
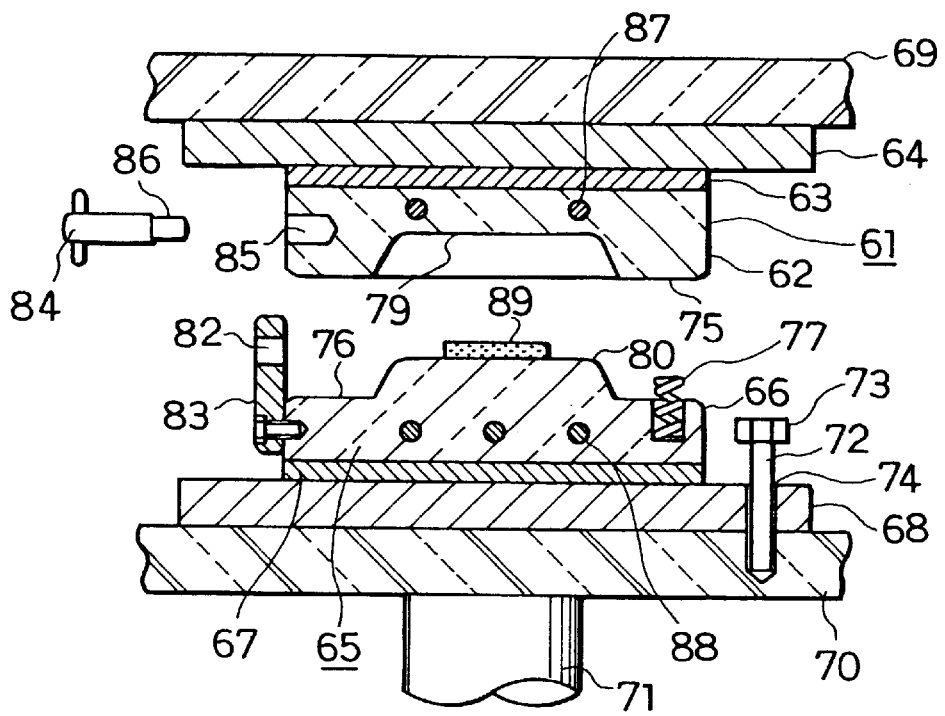
FIGS. 7A and 7B are a partial sectional view of the mold for compression molding which is used in other examples of the present invention.
Figure 7B:
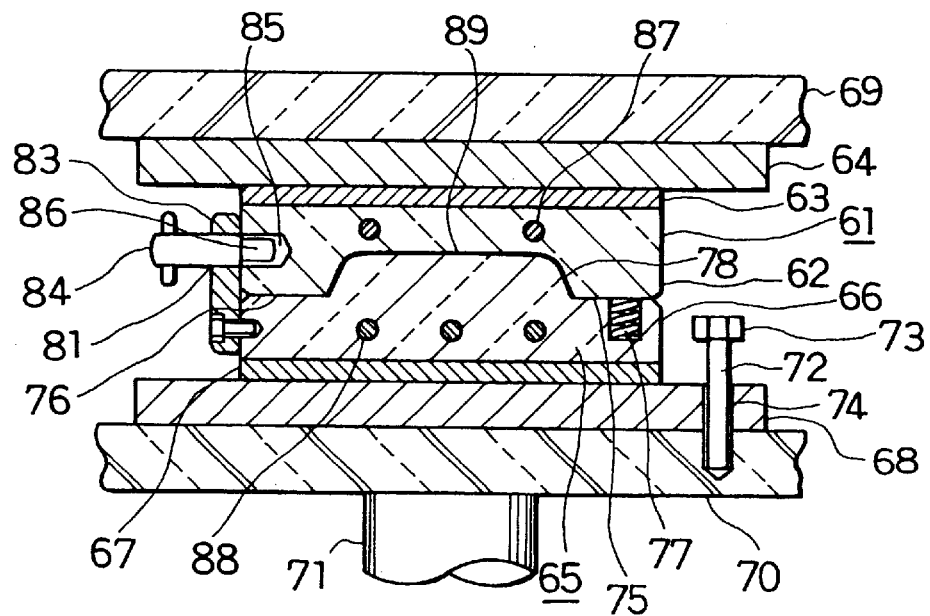

The mold used for the compression molding in EXAMPLE 79 is shown in FIG. 7A and 7B. FIG. 7A and 7B are a partially sectional view of the mold. The constitution of the mold in FIG. 7 was almost the same as that of the mold in FIG. 4 which was used in EXAMPLE 11 except that the head 73 of the pin was apart from the movable clamping plate 68 for about 30 mm and that the supplemental spring 77 was fitted on the parting surface of the movable side 65. The spring 77 had elastic force which functions to open the parting surfaces 75 and 76.

Further, on the walls 79 and 80 of the cavity 78, the texture was formed by embossing in the same manner as in the above-mentioned EXAMPLE 75 to form the rough surface with the flow resistance. This was to prevent the molding compound from slipping in the flowing direction on the walls 79 and 80 of the cavity 78.

The fine gap between the parting surfaces 75 and 76 could be controlled in the same manner as in EXAMPLE 11.

It was noted that the temperature of the mold was kept to 180° C. by the cartridge heaters 87 and 88. The diameter of the head 86 of the regulating pin 84 was 14.8 mm and the diameter of the hole 85 was 15.0 mm to make the fine gap of 0.1 mm between the parting surfaces 75 and 76.

In concrete, the molding compound in the form of tablet 89 was put on the center of the wall 80 of the movable side 65 while opening the movable side 65 and the stationary side 61 as shown in (a) of FIG. 7. Then, by moving the ram 71 forward, the stationary side 61 and the movable side 65 was closed in order to tightly close the parting surfaces 75 and 76 while compressing the supplemental spring 77, resulting that the cavity 78 was formed. The molding compound 89 was charged into the cavity 78 without slipping and the water was vaporized to generate a water vapor.

Then, by inserting the regulating pin 84 into the inserting pore 82 and the hole 85 and positioning the head 86 within the hole 85 (refer to (b) of FIG. 7), the regulating means was set. In this state, the ram 71 was moved backward, the clamping force to the stationary side 61 and the movable side 65 was released. Thereby, the parting surfaces were opened by the supplemental spring 77 and the water vapor pressure in the cavity 78 rapidly and easily. Therebetween, the fine gap of 0.1 mm which was regulated by the regulating means 81 was formed. The generated water vapor in the cavity 78 was discharged smoothly from the fine gap to dry quickly and confirmly the molded article.

After the completion of the discharging of the water vapor, the stationary side 61 and the movable side 65 were closed. Then, by removing the regulating means 81 by pulling off the regulating pin 84 from the inserting pore 82 and the hole 85, the molded article can be released easily after opening the stationary side 61 and the movable side 65.

INDUSTRIAL APPLICABILITY

According to the present invention of the embodiment 1, a molding compound for making a article including a cellulose fiber which is not liable to adhere or stick onto a wall of a kneader during the kneading step and is facilitating water discharge during the molding step can be obtained. Further, the molding compound provides a molded article which is easily released from the mold and does not generate a crack.

According to the present invention of the embodiment 2, a molding method for making an article including a cellulose fiber may be conducted without providing the degassing means with micropores and without generating the flash. Further, in the method, the water vapor can be discharged smoothly and reliably in a short period of time and the charging pressure can be increased.

According to the present invention of the embodiment 3, the mold having a flow resistance on the wall of cavity does not cause the slip-flow when the molding compound is charged to provide an molded article with excellent characteristics.

According to the present invention of the embodiment 4, the effects of the above-mentioned embodiments 1 to 3 can be achieved at the same time.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A method for molding an article including a cellulose fiber comprising the steps of: (a) preparing a molding compound by mixing a cellulose fiber with at least a water-soluble binder and water, (b) charging the molding compound into a cavity formed between a stationary side and a movable side of a mold heated to 120 to 220° C. while tightly closing the parting surfaces of said sides, (c) forming a fine gap of 0.02 to 0.50 mm between said parting surfaces, (d) discharging a resultant water vapor in said cavity through said fine gap, and (e) drying and solidifying said molding compound.

2. The method for molding an article including a cellulose fiber in accordance with claim 1, wherein a fine gap of 0.05 mm to 0.30 mm is formed in the step (c).

3. The method for molding an article including a cellulose fiber in accordance with claim 1, wherein, after the step (d) and before the step (e), a cycle of the step of closing again the parting surfaces tightly and the step of opening the parting surfaces is conducted for at least one time.

4. A method for molding an article including a cellulose fiber comprising the steps of: (i-1) preparing a molding compound by mixing a cellulose fiber with at least a water-soluble binder and water, (ii-1) charging said compound into a cavity of a heated mold wherein at least a portion of the wall of the cavity has a roughened surface which is resistant to the charging flow in the charging direction, said roughened surface preventing said molding compounding from sliding along the wall of the cavity, (iii-1) vaporizing the water in said molding compound, and (iv-1) discharging a resultant water vapor to solidify said molding compound.

5. A method for molding an article including a cellulose fiber comprising the steps of: (i-2) preparing a molding compound by mixing a cellulose fiber with at least a water-soluble binder and water, (ii-2) heating a mold into which the molding compound is charged to 120 to 220° C., (iii-2) charging said compound into a cavity of a mold, wherein at least a portion of the wall of the cavity has a roughened surface which is resistant to the charging flow in the charging direction to form a solidified surface layer sequentially at the interface between the wall of the cavity and the molding compound and the surface layer is formed continuously in the charging direction, said roughened surface preventing said molding compounding from sliding along the wall of the cavity, (iv-2) vaporizing the water in the molding compound, and (v-2) discharging a resultant water vapor to solidify the molding compound.

6. The method of claim 5 wherein the roughened surface is formed by embossing.

7. The method of claim 5 wherein the roughened surface is formed utilizing wire gauze.

8. The method of claim 5, wherein the roughened surface exhibits a sawtooth shape in the cross section thereof.

9. The method of claim 5 wherein the roughened surface is formed by adhering abrasive grain to said wall.

10. A method for molding an article including a cellulose fiber comprising the steps of: (A) preparing a molding compound by mixing 50 to 100 parts by weight of the cellulose fiber and 10 to 50 parts by weight of a water-soluble binder to obtain a mixture X, mixing 50 to 200 parts of water and 100 parts of the mixture X to obtain a mixture Y, and mixing 100 parts of the mixture Y and 0.2 to 2.0 parts of the long chain fatty acid salt of a non-alkali metal, (B) forming a rough surface resistant to the charging flow on at least a portion of a wall of a cavity in a mold in the charging direction, (C) charging the molding compound into the cavity heated to 120 to 220° C. while tightly joining parting surfaces of the mold, (D) forming a fine gap of 0.02 to 0.50 mm between the parting surfaces, and (E) discharging a resultant water vapor generated in the cavity through the fine gap to dry and solidify the molding compound.

* * * * *